Jan. 25, 1966   J. W. ACKLEY ETAL   3,231,198
SPRAY BOOM STRUCTURE

Filed Feb. 21, 1964   2 Sheets-Sheet 1

INVENTORS
JOHN W. ACKLEY &
CHARLES K. STRALOW
BY
ATTORNEY

Jan. 25, 1966   J. W. ACKLEY ETAL   3,231,198
SPRAY BOOM STRUCTURE

Filed Feb. 21, 1964   2 Sheets-Sheet 2

INVENTORS
JOHN W. ACKLEY &
CHARLES K. STRALOW

BY

ATTORNEY

United States Patent Office 3,231,198
Patented Jan. 25, 1966

3,231,198
SPRAY BOOM STRUCTURE
John W. Ackley and Charles K. Stralow, Moline, Ill., assignors to Deere & Company, Moline, Ill., a corporation of Delaware
Filed Feb. 21, 1964, Ser. No. 346,572
9 Claims. (Cl. 239—168)

The present invention relates generally to sprayers, and more particularly to sprayers adapted to be carried to the rear of a tractor.

It has been found in prior art spraying devices in which outer booms are employed, that project normally transversely to the direction of travel that, it is sometimes necessary to move the booms from this position to another when transporting the sprayer under various conditions. To this end various solutions and devices have been proposed for holding the booms in various positions of transport. However, none of the prior art devices has been entirely satisfactory in that insufficient positions of transport have been provided. Thus, while provision may have been made for holding the outer booms in one transport position, it sometimes occurs that this position will not be satisfactory and it is necessary to either dismantle the entire machine to transport the outer booms under adverse conditions, or to avoid these adverse conditions. For example, some prior art sprayers provide for a transport position in which the outer booms are swung to a vertically extending position. While this position is satisfactory under most conditions, it sometimes happens that the booms, if left in this position, may become entangled with low branches, or telephone or electrical wires. While generally this problem can be avoided simply by lowering the booms at the particular point of difficulty, this solution is not always possible. Thus if low branches or lines are encountered when attempting to pass through a gate, the operator of the sprayer will find it necessary to dismantle the sprayer before it can be transported through the gate.

Another solution to the transport problem has been to provide a structure in which the booms can be swung towards the rear, as for example in the manner illustrated in FIG. 1. While this manner of transporting the outer booms does not have the serious drawbacks as does the previous manner, it has been found that lower transport speeds must be employed to keep the booms from unnecessary bouncing, and also that it is more difficult to maneuver the tractor with the booms extending to the rear.

It is also desirable to provide a temporary transport position in which the outer booms can be manipulated from the platform or operator's station of the tractor to permit passing through narrow gates when moving from one field to another during the course of spraying.

To this end, it is an object of the present invention to provide a boom frame structure in which the outer booms may be moved from their working position to a temporary transport position, a rearwardly extending transport position, or a vertical transport position.

One particular object of the present invention is to provide a spray boom construction in which the outer boom sections can be swung from their normal transverse working position upwardly to a vertical transport position for highway transport.

Another object of the present invention is to provide a spray boom construction for a sprayer carried to the rear of a tractor in which the outer spray booms can easily be swung towards the rear of the tractor by a simple mechanism controllable from the operating platform of the tractor. More specifically, it is an object to provide a spray boom construction in which the outer booms can be moved to a temporary transport position simply by pulling mounting ropes which carry the weight of the spray boom, the mounting ropes being operable from the operator's station or platform on the tractor.

Another object of the present invention is to provide a spray boom construction for sprayers adapted to be mounted on the rear of tractors in which the outer spray booms may easily be swung from their normal transverse working position to a rearwardly extending horizontal position, this position being suitable for highway transportation, especially where low lying lines or branches of trees may be encountered.

Another object of the present invention is to provide a spray boom construction which may be easily fabricated from inexpensive parts.

These and other objects and advantages of this invention will be apparent to those skilled in the art after a consideration of the following detailed description, taken in conjunction with the accompanying drawings, in which the preferred form of this invention is illustrated.

In the following description right- and left-hand reference is determined by standing to the rear of the tractor and facing the direction of travel.

Figure 1:
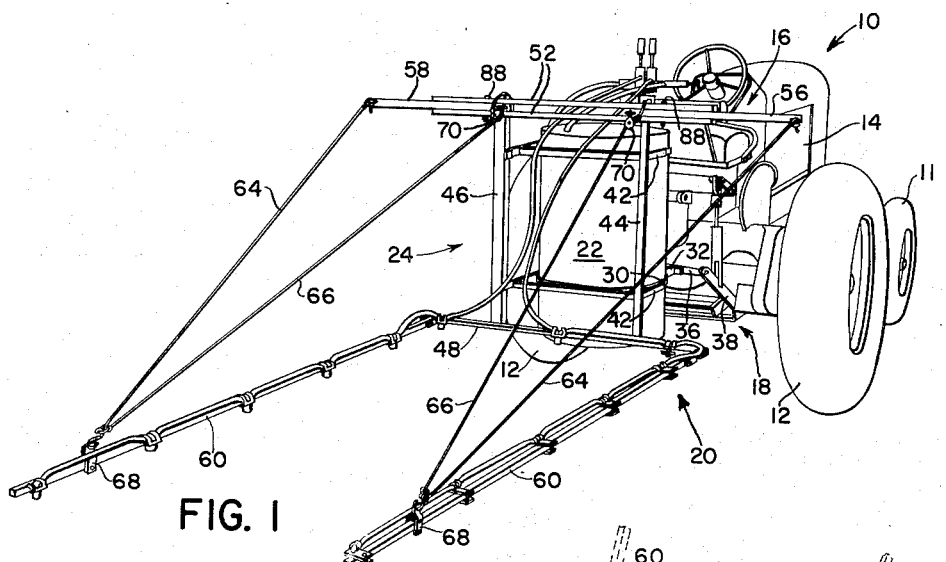
FIG. 1 is a perspective view of a sprayer mounted on a tractor, the sprayer being provided with the spray boom construction of the present invention, the outer booms of the sprayer being disposed in their rearward highway transport position.
Figure 2:
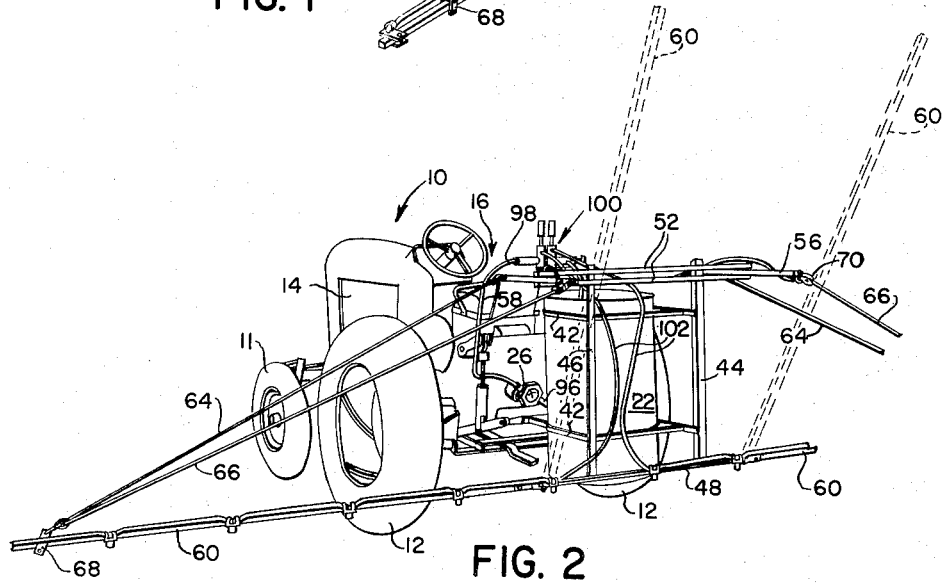
FIG. 2 is a view similar to FIG. 1 in which the outer spray booms are disposed in their normal working position.

Referring first to FIG. 1, a tractor 10 is shown on which the spraying structure of the present invention is mounted. The tractor is generally conventional and includes front wheels 11 and spaced apart rear wheels 12, a longitudinally extending main body portion 14 having an operator's station or platform 16 at the rear. Mounted on the tractor hitch device, indicated generally at 18, is a sprayer indicated generally at 20. The sprayer includes a spray tank or barrel 22, a boom and boom-supporting structure indicated generally at 24, and a pump 26 (FIG. 2).

The spray tank or barrel 22 is supported on the tractor hitch device 18 by means of a barrel frame structure which includes upper and lower straps 28 and 30, respectively, which are rigidly secured about the barrel 22. Forwardly extending bracket members 32 are secured to the upper and lower straps, the upper bracket member (not shown) being provided with means adapted to receive the upper compression link 34, the lower bracket 32 being rigidly secured to a cross bar 36 which is in turn received by the lower draft links 38 of a tractor. The upper and lower links 34 and 38 are generally conventional and the manner in which they are secured to the tractor is not material to the present invention. However it should be noted that the links can be moved up and down in a conventional manner.

Figure 3:
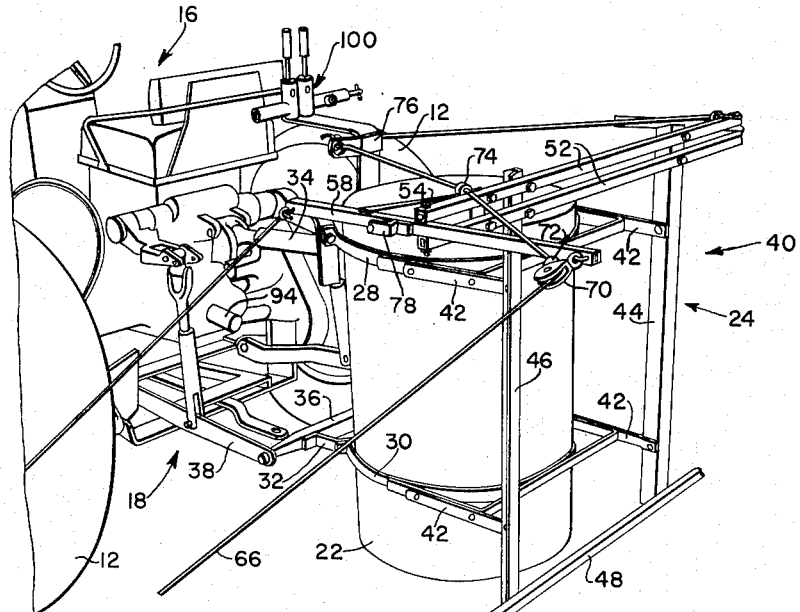
FIG. 3 is an enlarged view somewhat similar to FIG. 2 showing the details of the sprayer boom support structure.

According to the principles of this invention, a boom frame, indicated generally at 40 (FIG. 3) is carried by the barrel straps 28 and 30, and to this end four rearwardly extending boom frame supports 42 are bolted (or fixed in any other fashion) at their forward ends to the straps 28 and 30, two of the boom frame supports being bolted to the left of the barrel 22, and the other two boom frame supports being bolted to the right of the barrel. Secured to the right and left pairs of boom frame supports are right and left upright sections 44 and 46, respectively. Fastened to the lower end portions of the right- and left-hand upright sections is a center boom section 48. Attached to the upper end portions of the sections 44 and 46 is the top section of the boom frame, which is formed of two spaced apart bars 52, the bars being apertured at either end to receive pin means 54, (FIG. 3) to which are secured for swinging movement right and left horizontal frame members 56 and 58, respectively. The horizontal frame members are normally disposed in a fore-and-aft position, see FIG. 2, but may be swung in a manner to be set forth below, to a transverse position such as that illustrated in FIG. 1. Outer booms 60 are secured to the center boom section 48 by means of universal joints 62 (FIG. 3). The universal joints 62 are in vertical alinement with the pin means 54. The outer booms are normally supported in a working position by first and second boom support means 64 and 66, respectively, which normally take the form of ropes. The first boom support means is of fixed length and is secured at one end to the forward portion of the horizontal frame member 56 or 58, and at the other end to a bracket 68 mounted on the outer boom. The second boom support means, which is also a rope, is secured at its outer end to the bracket 68 and its inner end is disposed over a pulley 70 which is in turn secured to the rear of the horizontal frame members 56 or 58. The rope which forms the second boom support means is extended beyond the pulley 70 towards the operator's station 16 in such a manner that it can be engaged by the operator of the tractor. Secured about the rope 66 are stops 72 and 74 (FIG. 3), the stop 72 being adapted to engage the pulley 70 when the rope 66 is in its fixed position, such as that shown in FIG. 3, and the stop 74 being adapted to engage the keyhole slot in bracket 76 when the operator has pulled the rope to its forward position, this position swinging the boom 60 to its upward and rearward extending position shown in dotted lines in FIG. 2. The ropes 64 and 66 can be made of one continuous length and if so they are knotted about the bracket 68 or otherwise secured thereto.

Figure 4:
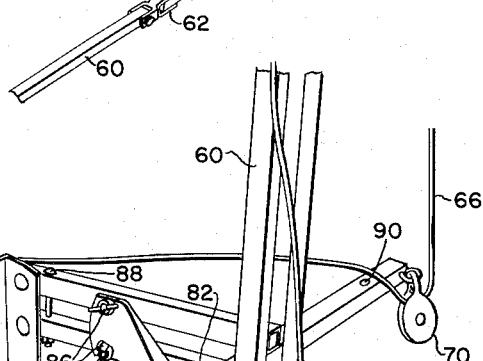
FIG. 4 is a detailed view of the boom frame showing one of the outer boom sections in its vertical transport position.

Rigidly secured to a central portion of the right and left horizontal frame members 56 and 58 are outwardly projecting brackets 78 which are adapted to receive the outer booms and hold them in a vertical position as best illustrated in FIG. 4. To this end the bracket 78 is apertured to receive a holding pin 80 which is adapted to pass through the frame members 56 or 58 and to be secured thereto in a conventional manner such as by a cotter pin 82. Thus, when it is desired to transport the outer booms in a vertical position it is only necessary to swing the booms to the vertical position, to remove the pin 80, to insert the boom within the bracket 78 and to then replace the pin 80 to hold the boom in its vertical position.

To permit the booms 60 to be carried in a rearward extending position, the right and left horizontal frame members 56 and 58 are adapted to be swung between the normal fore-and-aft position shown in FIGS. 2, 3, and 4, to a transverse position shown in FIG. 1. To this end it should be noted that each of the frame members 56 and 58 is held between the spaced apart bars 52 by means of a pivot pin 54, and means in the form of a bracket 84 is rigidly secured to a forward inner portion of the frame members 56, 58 and extends rearwardly and inwardly to a portion which is adapted to engage the bars 52. The bracket can be secured thereto by means of bolts and wing nuts 86. To swing the members 56, 58 to their transverse position, it is only necessary to remove the wing nuts 86, and to swing the frame members 56, 58 to the transport position shown in FIG. 1 about pivot pin 54. Pin means 88 are provided which can be passed through the aperture 90 near one end of the members 56, 58 to hold the members in their transverse position. When the horizontal members 56, 58 are in their transverse position, the outer booms 60 will be held by the ropes 64 and 66 in a rearwardly extending position shown in FIG. 1.

The pump 26 (FIG. 2) is secured to the rear tractor PTO 94 (FIG. 3), and is adapted to receive spray material from the barrel 22 through the hose 96. A delivery hose 98 is secured to the outlet end of the pump and is connectible to the outer booms 60 and centerboom 48 through means of valve means 100 which are actuable from the operator's platform and lines 102 which are connectible to nozzles mounted on the boom sections in a manner more fully described in copending application Ser. No. 151,561.

While we have shown and described above the preferred structure in which the principles of the present invention have been incorporated, it is to be understood that our invention is not to be limited to the particular details, shown and described above, but that, in fact, widely different means may be employed in the practice of the broader aspects of our invention.

We claim:
1. The combination with a tractor having an operator's station of a sprayer mounted on the rear of the tractor, said sprayer including, a boom frame structure having upper and lower portions, a generally fore-and-aft frame member secured to an upper portion of said boom frame structure, said frame member having front and rear portions, an outer spray boom having inner and outer portions, universal joint means interconnecting the inner portion of said outer spray boom with a lower portion of said boom frame structure, first outer boom support means interconnecting the front portion of said fore-and-aft frame member and an outer portion of said outer spray boom, second extensible and retractable outer boom support means disposed between the rear portion of said fore-and-aft frame member and an outer portion of said boom, and means operable from the operator's station to cause the second outer boom support means to become extended or retracted, the parts being so arranged and constructed that when said second outer boom support is in its extended position the outer boom is disposed in a generally transverse position, and when said second outer boom support means is in its retracted position, the outer boom is disposed in a generally rearwardly and upwardly extending position.

2. The invention set forth in claim 1 in which the generally fore-and-aft extending frame member is provided with an outwardly projecting means adapted to securely hold the outer boom in a generally vertical position.

3. The invention set forth in claim 1 in which said fore-and-aft frame member is pivotally carried by the upper portion of the boom frame structure and is adapted to be swung from a normal fore-and-aft position to a generally transverse position, the parts being so arranged and constructed that when the second outer boom support means is in its extended position and when the generally fore-and-aft member is in its normal position the outer boom is disposed in a generally transverse position, and when the second outer boom support means is in its extended position and when the generally fore-and-aft member is disposed in its transverse position the boom is disposed in a generally fore-and-aft extending position.

4. A sprayer boom construction comprising a boom frame structure having upper and lower portions, a generally horizontal frame member carried by an upper portion of the boom frame structure and swingable between fore-and-aft and transverse positions, means operable to hold the horizontal frame member in its selected position, a horizontally extending outer boom having inner and outer portions, universal joint means interconnecting the inner portion of said outer boom with a lower portion of said boom frame structure, and means interconnecting said boom and said horizontal frame member and normally operable to hold said boom at right angles to said horizontal frame member, the parts being so arranged and constructed that when the horizontal frame member is swung from the fore-and-aft position to the transverse position the outer boom will be swung from a transverse position to a fore-and-aft position.

5. The invention set forth in claim 4 in which means are provided on the generally horizontal frame member to hold the outer boom in a generally vertical transport position.

6. The invention set forth in claim 4 in which said means interconnecting said boom and said horizontal member includes a first outer boom support means fixed between the boom and one end of the horizontal member and a second outer boom support means disposed between the boom and the other end of the horizontal member, the effective length of said second member being extensible and retractable, the parts being normally so arranged and constructed that when the second support member is in its extended position, the boom is disposed at right angles to the horizontal member, and when said second member is in its retracted position the boom is disposed in an upwardly and rearwardly extending position.

7. The invention set forth in claim 6 in which means are provided on the generally horizontal frame member to hold the outer boom in a generally vertical transport position.

8. The combination with a tractor having an operator's station of a sprayer mounted on the rear of the tractor, said sprayer including, a boom frame structure having upper and lower portions, a frame member having normally front and rear portions, said member being pivotally secured at its midportion to an upper portion of said boom frame structure and swingable from a normal fore-and-aft position to a generally transverse transport position, means to hold said frame member in either of said positions, an outer spray boom normally disposed in a horizontal position and having inner and outer portions, universal joint means interconnecting the inner portion of said boom with a lower portion of said boom frame structure, outwardly projecting means on said frame member adapted to hold the outer boom in a generally vertical position, first outer boom support means fixed between said front portion of said frame member and said outer portion of said boom, second outer boom support means disposed between the rear portion of said frame member and the outer portion of said boom, the effective length of said second outer boom support means being extensible and retractable, and means operable from the operator's station to cause the second outer boom support means to become extended or retracted.

9. The combination with a tractor having an operator's station of a sprayer mounted on the rear of the tractor, said sprayer including, a boom frame structure having upper and lower portions, a frame member having normally front and rear portions, said member being pivotally secured at its midportion to an upper portion of said boom frame structure and swingable from a fore-and-aft position to a generally transverse position, an outer spray boom having inner and outer portions, universal joint means interconnecting the inner portion of said boom with a lower portion of said boom frame structure, said universal joint being in vertical alinement with the pivotal connection between said frame member and the upper portion of said boom frame, first and second outer boom support means fixed between an outer portion of said boom and front and rear portions of said frame member, respectively, the parts being so arranged and constructed that when said frame member is in its fore-and-aft position the outer boom is disposed in a generally transverse position, and when said frame member is disposed in its transverse position the boom is disposed in a generally fore-and-aft extending position.

References Cited by the Examiner

UNITED STATES PATENTS

| 2,221,433 | 11/1940 | Pitner | 239—168 |
| 2,770,493 | 11/1956 | Fieber | 239—168 |
| 3,090,562 | 5/1963 | Richardson | 239—167 |

FOREIGN PATENTS

| 154,283 | 4/1952 | Australia. |

M. HENSON WOOD, Jr., *Primary Examiner.*

EVERETT W. KIRBY, *Examiner.*